United States Patent [19]

Peter et al.

[11] Patent Number: 4,951,772
[45] Date of Patent: Aug. 28, 1990

[54] DEVICE FOR ACTUATING THE THROTTLE VALVE OF AN INTERNAL COMBUSTION ENGINE, ESPECIALLY IN MOTOR VEHICLES

[75] Inventors: Cornelius Peter, Ottersweiher; Eckhard Ursel, Buehl; Uwe Schaper, Buehl-Vimbuch, all of Fed. Rep. of Germany

[73] Assignee: Robert Bosch GmbH, Stuttgart, Fed. Rep. of Germany

[21] Appl. No.: 269,334

[22] Filed: Nov. 10, 1988

[30] Foreign Application Priority Data

Nov. 12, 1987 [DE] Fed. Rep. of Germany ....... 3738415
Apr. 30, 1988 [DE] Fed. Rep. of Germany ....... 3814702

[51] Int. Cl.$^5$ ............................................. B60K 31/00
[52] U.S. Cl. .................................... 180/197; 123/361
[58] Field of Search ............... 180/197; 123/361, 323, 123/399; 364/426

[56] References Cited

U.S. PATENT DOCUMENTS

| | | | |
|---|---|---|---|
| 4,548,176 | 10/1985 | Ishida et al. | 123/342 |
| 4,603,675 | 8/1986 | Junginger et al. | 123/478 |
| 4,622,936 | 11/1986 | Junginger et al. | 123/399 |
| 4,703,823 | 11/1987 | Yogo et al. | 180/197 |
| 4,714,864 | 12/1987 | Yogo et al. | 180/197 X |
| 4,771,849 | 9/1988 | Leiber et al. | 180/197 |

FOREIGN PATENT DOCUMENTS

A-0107265 5/1984 European Pat. Off. .
A-3810270 10/1988 Fed. Rep. of Germany .
1593896 7/1981 United Kingdom .

OTHER PUBLICATIONS

Kolberg, G., Elektronische Motorsteuerung für Kraftfahrzeuge, MTZ Motortechnische Zeitschrift 46 (1985) Heft 4, pp. 129-133.

Primary Examiner—Charles A. Marmor
Assistant Examiner—Michael Mar
Attorney, Agent, or Firm—Edwin E. Greigg

[57] ABSTRACT

An apparatus which serves to actuate the throttle valve of an internal combustion engine of a motor vehicle. The actuating device includes a reversible electric drive motor, the output shaft of which is operatively connected to the throttle valve, which is pivotable via a throttle valve shaft. The set-point pivoted position of the throttle valve can be predetermined by means of a gas pedal. A simple, economical design of such an actuating device is attained by coupling the throttle valve to a stop such that they rotate together; associated with the stop is a counterpart stop that is spring-loaded in the closing direction of the throttle valve by a restoring spring. The counterpart stop is coupled with the gas pedal in such a way that it is moved by the drive lever counter to the force of the restoring spring.

12 Claims, 6 Drawing Sheets

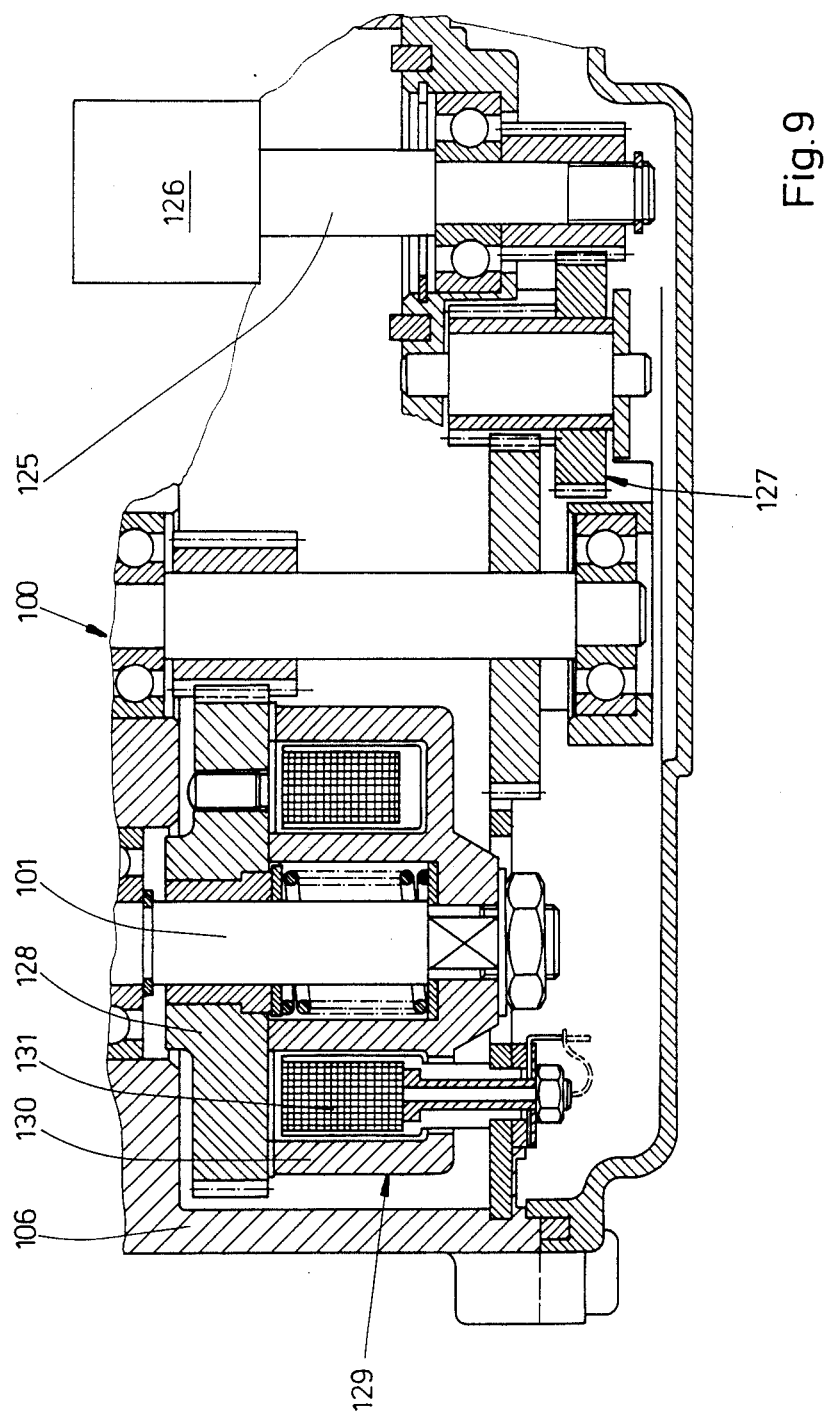

DEVICE FOR ACTUATING THE THROTTLE VALVE OF AN INTERNAL COMBUSTION ENGINE, ESPECIALLY IN MOTOR VEHICLES

BACKGROUND OF THE INVENTION

The invention is based on an actuating device for actuating the throttle valve of an internal combustion engine, especially in motor vehicles. Such devices are used for instance for automatically optimizing the acceleration of the vehicle on problematic road surfaces; among other signals, a computer receives signals from sensors that detect the instantaneous slip between the drive wheels and the road surface. If this slip becomes excessive, the drive motor causes a closing movement of the throttle valve, until the slip returns to the acceptable range.

An actuating device is already in commerce in which the computer for the drive motor dictates all the adusting movments of the throttle valve, so that they are executed by the drive motor. To prevent the computer from being capable of emitting inappropriate control pulses to the drive motor, a costly logic system is necessary for safety reasons.

OBJECT AND SUMMARY OF THE INVENTION

The actuating device according to the invention has the advantage over the prior art that although the throttle valve is actuated by the drive motor during normal vehicle operation, the drive motor effects only a followup of the throttle valve stop with respect to the counterpart stop, which is dependent on a set-point value transducer. The drive motor does not undertake an independent regulation of the throttle valve unless one of the drive wheels exhibits excessive slip, resulting in a corresponding pulse that trips a closing movement of the throttle valve. A corrective regulating motion of the throttle valve is accordingly possible only in a range that is defined by the closing position at one end and by the counterpart stop at the other. The provision according to the invention makes it possible to dispense with a large part of the costly safety logic system.

Advantageous further developments of and improvements to the actuating device defined are possible with the provisions recited in the dependent claims.

It is particularly advantageous if the maximum torque exerted on the stop by the drive motor is less than the torque exerted on the counterpart stop by the restoring spring, because as a result, in the event of a malfunction, the throttle valve automatically assumes its closing position because of the force of the restoring spring.

In an advantageous embodiment of the invention, an electric set-point value transducer is coupled with a drive lever, and the output signals of this transducer, supplied to the control unit, are a standard for the instantaneous position of the drive lever; the control unit additionally controls the drive motor in a followup movement to the counterpart stop, as a function of these electrical set-point value signals. The stop, secured for rotation with the throttle valve, is loaded by an idling spring, the force of which acts counter to and is substantially less than that of the restoring spring. The advantage of this embodiment is that if the control unit should fail, or if the drive motor is shut off by the control unit in a malfunction, the throttle valve is held in a raised idling position by the idling spring, and the engine will not be shut off. Immediate emergency operation, without re-starting the engine, is possible.

In a useful embodiment of the invention, a preferably electromagnetic clutch is disposed between the output shaft of the drive motor and the throttle valve shaft; during proper operation, the clutch is engaged, while if the control unit fails and/or if the drive motor is disconnected from electric current by the control unit, the clutch is disengaged. Hence if there is a malfunction, the stop is disconnected from the drive motor. The idling spring puts the throttle valve in the raised idling position, where when the drive lever is not actuated the stop rests on the counterpart stop. Upon displacement of the counterpart stop, the stop is followed up by the idling spring; emergency operation is possible. The separation of the stop from the drive motor in the event of a malfunction, as provided by the invention, means that the spring force of the idling spring need not overcome the frictional resistance of the drive motor and gears and can be better adapted to the restoring spring with a view to unimpeded operation.

In a further embodiment of the invention, providing for free-wheeling in the connection between the driver plate and the drive lever such that the driver plate can be displaced counter to the stationary drive lever makes cruise control operation possible. With a Bowden cable type of connection, this free-wheeling is assured by the engagement of the Bowden cable with the driver plate in the tensile direction, via a movable stop bolt, and the guidance of the Bowden cable in a guide on the driver plate. In the case of a bar linkage type of connection, the driver plate in a further embodiment of the invention is pivotably connected to a crank rod, which is pivotably connected to a pivot lever having a stationary pivot axis and a curved slot concentric with the pivot axis. A link block, disposed on a lever that is pivotable about the pivot lever pivot axis, is guided in the slot. The pivotable lever is pivotably connected to a connecting rod leading to the drive lever. In cruise control operation, the link block, which is displaceable in the slot when the drive lever is stationary, assures the required freewheeling.

If the electrical set-point value transducer is secured for rotation with the counterpart stop, as in a preferred embodiment of the invention, then the set-point value transducer can advantageously be integrated with the device itself. The set-point value transducer is suitably embodied as a rotational angle potentiometer, of which the electrical wiper path is disposed on the driver plate, and its wiper contacting the wiper path is disposed on a housing part of the device. The wiper path and wiper can also interchanged, that is, one being disposed on the driver plate and the other on the driver shaft and housing part.

Since in addition to the set-point transducer, an electrical actual-value transducer is typically present as well, which detects the rotary position of the throttle valve and sends it to the control unit, the rotational angle potentiometer for the set-point value transducer and that for the actual-value transducer are advantageously housed on a single component, which is preferably the insulating plate fixed within the housing. The wiper paths of the two rotational angle potentiometers are disposed on the insulating plate, while the wipers are mounted on and secured for rotation with the driver shaft and the throttle valve shaft, respectively.

The invention will be better understood and further objects and advantages thereof will become more apparent from the ensuing detailed description of preferred embodiments taken in conjunction with the drawings.

BRIEF DESCRIPTION OF THE DRAWINGS

FIG. 9 is a detail view in the direction of the arrow IX of FIG. 2 of the actuating device of FIGS. 5 and 6 or FIGS. 7 and 8.

DESCRIPTION OF THE EXEMPLARY EMBODIMENTS

Figure 1:
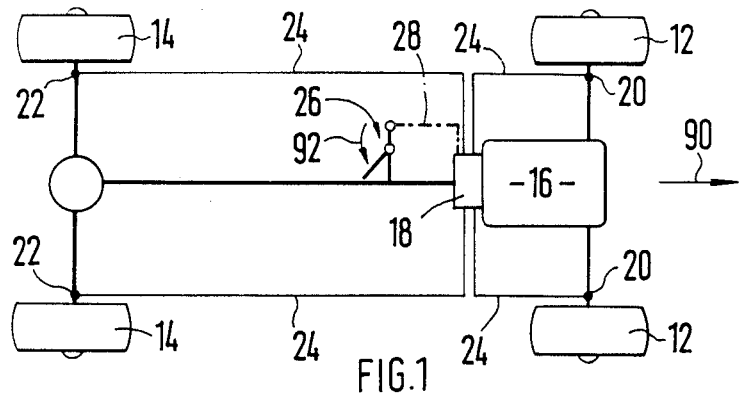
FIG. 1 is a basic sketch of a motor vehicle equipped with the actuating device according to the invention.

A motor vehicle 10 shown in its basic outline in plan view in FIG. 1 has two drive wheels 12 and two driven wheels 14. The vehicle 10 also has an internal combustion engine 16 and a device 18 for actuating the throttle valve is associated with the engine. The actuating device 18 includes sensors for measuring the relative slip, or traction, between the road surface and the vehicle wheels 12, 14. The sensors of the drive wheels 12 are shown at 20, while the sensors of the driven wheels 14 are shown at 22. The sensors 20 and 22 are connected via control lines 24 with an electronic control unit 44 (FIG. 2), which is part of the actuating device 18. Also shown in FIG. 1 is the drive lever, or gas pedal or driving pedal 26, which represents a set-point value transducer for the actuating device 18. The gas pedal 26 is connected to the actuating device 18 via an element embodied as a Bowden cable 28.

Figure 2:
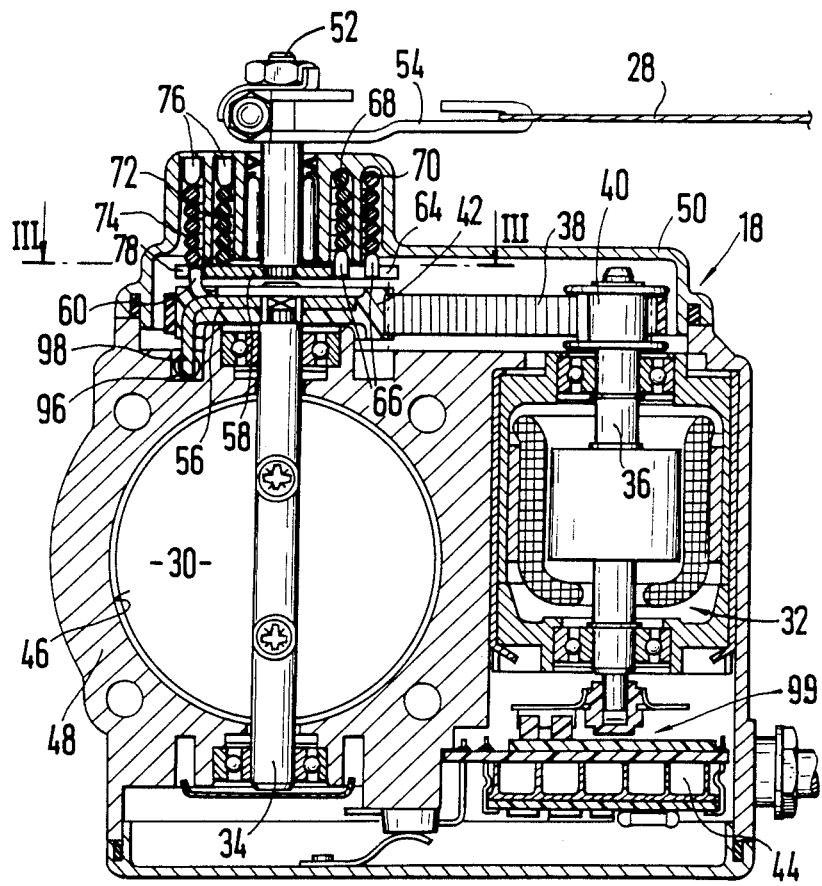
FIG. 2 is a section through the actuating device shown on a larger scale.

As FIG. 2 shows, the actuating device 18 has a throttle valve 30, which is rotatable via an electric drive motor 32 about the longitudinal axis of a throttle valve shaft 34 that belongs to the throttle valve 30. The output shaft 36 of the reversible, electrically commutated drive motor 32 is connected to the throttle valve shaft 34 via toothed belts 38. To this end, the output shaft 36 and the throttle valve shaft 34 each have a gear wheel cooperating with the teeth of the toothed belt 38. The gear wheel of the output shaft 36 is shown at 40, while the gear wheel of the throttle valve shaft is shown at 42. The commutation of the drive motor 32 is effected via the control unit or central electronic unit 44, in which the pulses of the sensors 20 and 22 are also stored in memory. The throttle valve 30 is disposed in an intake tube 46 that leads both to the engine 16 and, as from a carburetor belonging to the engine 16, to the combustion chambers of the engine. Depending on the position of the throttle valve 30, more or less of an ignitable mixture is delivered to the combustion chambers. The toothed belt transmission 40, 38, 42 between the output shaft 36 of the drive motor 32 and the throttle valve shaft 34 is covered with a lid 50 that is part of the housing 48.

Figure 3:
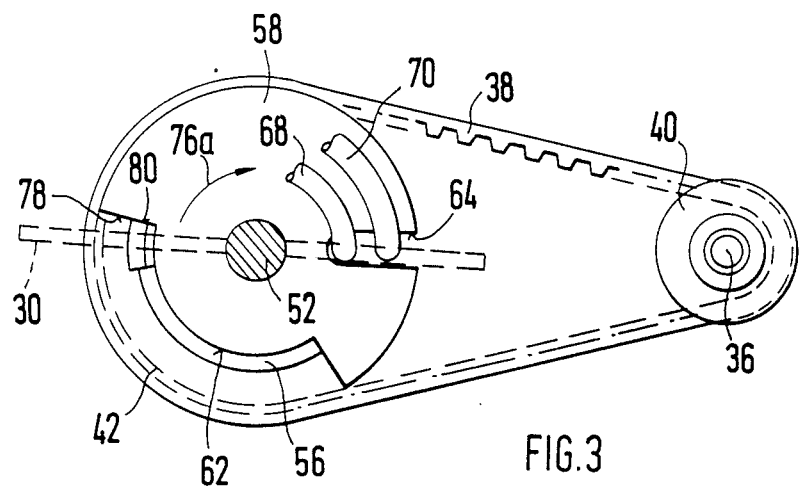
FIG. 3 is a fragmentary section through the actuating device taken along the line III—III, on a larger scale, in which the throttle valve is in the closing position.

An auxiliary shaft 52, rotatably supported in the lid 50, has its longitudinal or rotational axis in alignment with the axis of rotation of the throttle valve shaft 30. A component 54, for instance a Bowden cable or a lever engaged by the Bowden cable 28 leading to the driving pedal 26, is secured on the auxiliary shaft 52. A disk 56 is secured on the end of the throttle valve shaft 34 oriented toward the auxiliary shaft 52, while a plate 58 is secured on the end of the auxiliary shaft 52 oriented toward the throttle valve shaft 34. As shown particularly in FIG. 2, the disk 56 and the plate 58 are located in two parallel, adjacent planes. A protrusion 60 is bent outward from the disk 56 and extends as far as the plane in which the plate 58 is located. As FIGS. 3 and 4 particularly show, the plate 58 has a cutout 62 in the form of a circular segment, into which the protrusion 60 of the disk 56 protrudes. The plate 58 also has a substantially radially extending slit 64, open at the edge, into which right-angle bends 66 of two leg springs 68, 70, embodied as tension springs and received by annular groves 72, 74, of the lid 50 protrude. The other ends 76 of the two leg springs 68, 70, located in the annular grooves 72, 74, are also bent at a right angle and are secured to shoulders of the lid 50. The two leg springs 68, 70 are dimensionally different from one another in such a way that the leg spring 68 is surrounded by the other leg spring 70. Both leg springs 68, 70 are prestressed such that they seek to rotate the plate 58 counter to an arrow 76a shown in FIG. 3. In so doing, one radial edge 78 of the cutout 62 in the plate 58 strikes a face end 80, oriented toward it, of the protrusion 60. The face end 80 of the protrusion 60, which is firmly connected to the throttle valve 30 via the throttle valve shaft 34, thus forms a stop, which cooperates with a counterpart stop urged by the spring in the closing direction of the throttle valve; that is, it cooperates with the edge 78 of the cutout 62 in the plate 58. It should also be noted, in particular, that the torque produced by the drive motor 32 is less than the restoring moment produced by the two leg springs 68, 70 and transmitted to the throttle valve 80 or to the throttle valve shaft 34 via the plate 58, the counterpart stop 78, the stop 80 and the disk 56. The actuating device 18 also has a device 99 for commutating the drive motor 32, which also, as the actual-value transducer, detects the position of the throttle valve 30 at a given time and reports it to the central electronic unit 44.

Figure 4:
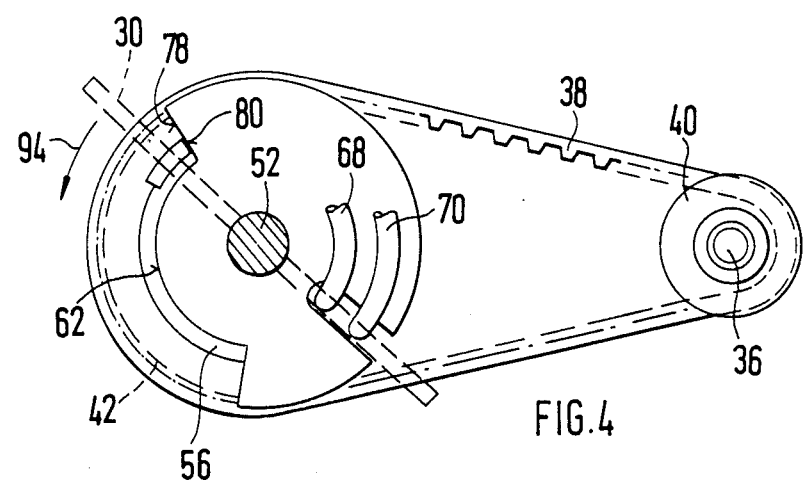
FIG. 4 is a fragmentary section corresponding to FIG. 3, in which the throttle valve is in an intermediate position between the closing position and the opening position.

During normal vehicle operation—that is, when the slip of the drive wheels 12 remains within specified limits and the vehicle is traveling in the direction of the arrow 90 (FIG. 1), the driver of the vehicle 10 depresses the driving pedal 26 in the direction of the arrow 92, which accelerates the vehicle. The Bowden cable 28 pulls the lever 54 and hence the auxiliary shaft 52 in the direction of the arrow 76a (FIG. 3), so that the plate 58 reaches its operating position shown in FIG. 4. Since during normal operation of the vehicle 10 the drive motor 32 seeks to rotate the gear wheel 42, and with it the disk 56 and the throttle valve 30, continuously in the direction of the arrow 76, the protrusion 60 follows the motion of the stop edge 78, whenever this edge rotates in the direction of the arrow 76a. The drive motor 32 thus executes a followup movement only within the limits of what is dictated at the plate 48, via the Bowden cable 28 and the stop edge 78, by the driving pedal 26, functioning as a throttle valve set-point value transducer. However, if one of the sensors 20 of the drive wheels 12 reports excess slip to the central electronic unit 44, then this unit reverses the drive motor 32, so that the protrusion 60 becomes disengaged from the counterpart stop edge 78 and the throttle valve 30 swivels back in the direction of its closing position. This restoring motion of the throttle valve 30 is shown in FIG. 4 by the arrow 94. The throttle valve 30 can thus be moved by the drive motor 32 within a range that is defined at one end by the instantaneous position of the counterpart stop edge 78 and on the other by the closing position stop 96 (FIG. 2). Cooperating with the closing position stop 96 is a leg 98 formed by bending part of the disk 56 out at an angle, in the opposite direction from the protrusion 60. The stop 96 is embodied on the housing 48. In the event of malfunctions, for instance in the central electronic unit 44, the incorrect control signals that might reach the drive motor 32 are easily rendered harmless, because when the driver releases the driving pedal 26 the two restoring springs 68, 70 force the throttle valve 30 into its idling position, contrary to any possible incorrect rotational motion of the drive motor 32. This is attained as a result of the restoring moment of the leg springs 68, 70, which is greater than the maximum torque produced by the drive motor 32.

The procedure for testing the functional readiness of the two leg springs 68, 70 forming a spring package may for example be as follows: Via the central electronic unit 44, the torque of the drive motor 32 is doubled for several milliseconds, at short intervals, such as every 50 milliseconds. If one of the two leg springs 68, 70 should happen to be broken, then the motor torque would be greater than that of the remaining leg spring, and so these test movements would be perceived by the computer, via the device 99, as "jerking" of the actuating device; the computer would then switch over to emergency operation, disconnecting the actuating device 18 from the electric current. The self-diagnosis equipment can recognize this mechanical defect during vehicle operation and can store it in memory or report it to a tester.

Figure 5:
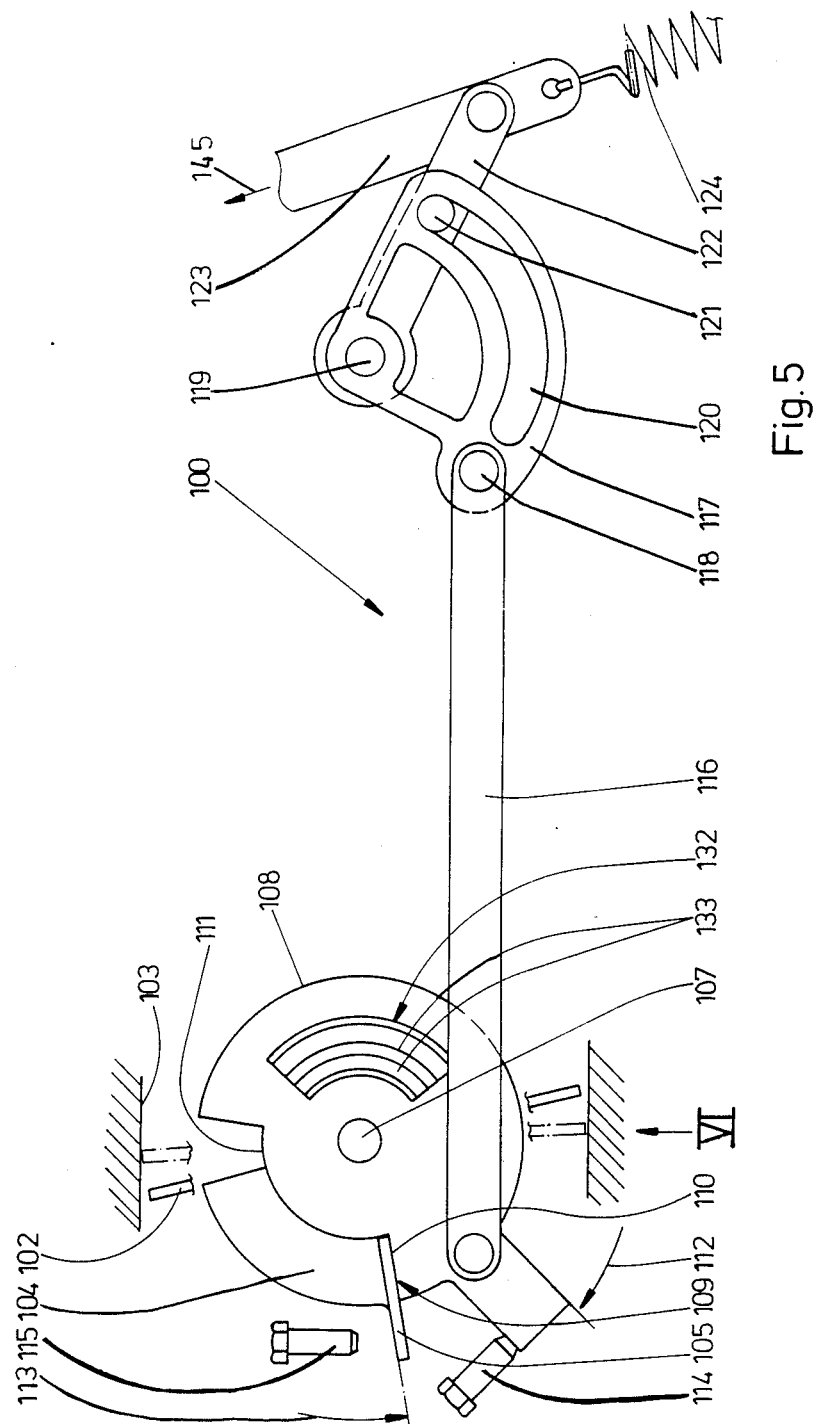
FIG. 5 is a detail view, seen in the direction of the arrow V of FIG. 2, of an actuating device in accordance with a further exemplary embodiment, shown schematically.
Figure 6:
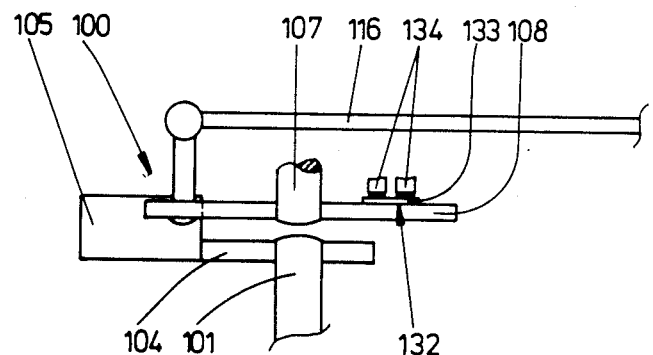
FIG. 6 is a detail view of the actuating device seen in the direction of the arrow VI of FIG. 5.

In the actuating device 100 for the throttle valve 102 rigidly joined to the throttle valve shaft 101, intended for closing or variably widely opening the intake tube 103, this device being shown in part in the detail views of FIGS. 5 and 6, a disk segment 104 is secured on and arranged for rotation with the throttle valve shaft 101; a stop 105 protrudes axially away from the disk segment 104. A driver shaft 107 is rotatably supported (FIG. 6), in alignment with the throttle valve shaft 101, in a housing 106 (FIG. 9). A driver plate 108 is mounted on the driver shaft 107 in a manner secured for rotation with it, and the driver plate bears a counterpart stop 109 cooperating with the stop 105. As in the exemplary embodiment of the actuating device 18 shown in FIGS. 1–4, the counterpart stop 109 is embodied by the radial boundary edge 110 of a recess 111 provided in the driver plate 108. Engaging the driver plate 108 is a prestressed restoring spring symbolically represented by an arrow 112 in FIG. 5; the arrow indicates the operative direction of the restoring spring. The restoring spring 112 is supported at one end on the housing 106 and at the other on the driver plate 108. The disk segment 104 is engaged by an idling spring, symbolically represented by the arrow 113 in FIG. 5, the arrow again indicating the operative direction of the idling spring 113. The idling spring 113 is supported on the housing 106 and on the disk segment 104. As shown in FIG. 2, the two springs 112, 113 may be embodied as torsion springs, one leg of each spring being retained in the housing 106 and the other leg of each being supported on the driver plate 108 and on the disk segment 104, respectively. The spring force of the restoring spring 112 is at least twice as great as that of the idling spring 113. Both the driver plate 108 and the disk segment 104 have an adjustable fixed stop associated with them and limits the rotational path of the driver plate 108 and disk segment 104. The fixed stop 114 associated with the driver plate 108 is disposed such that when the driver plate 108 rests on the fixed stop 114 and the stop 105 rests on the counterpart stop 109, the throttle valve 102 assumes a raised idling position, as shown in FIG. 5 with the detail, drawn in solid lines, of the throttle valve 102. The fixed stop 115 associated with the disk segment 104, contrarily, is disposed such that when the stop 105 rests on the fixed stop 115, the throttle valve 102 assumes its closing position, as shown in dot-dash lines in FIG. 5, counter to the force of the idling spring 113.

A crank rod 116 is pivotably connected to the driver plate 108, being connected via a joint 118 to a segment-like pivot lever 117. The pivot lever 117 is pivotable about a fixed pivot axis 119 and has a circular-arc-like slot 120 concentric with the pivot axis 119. A link block 121 disposed on a one-armed lever 122 is displaceably guided in the slot 120. The lever 122 is likewise pivotable about the pivot axis 119 and is pivotably connected to a coupling rod 123. The coupling rod 123 is pivotably connected to the drive lever, also known as the driving pedal or gas pedal, not shown here, and is retained by a tension spring 124 in a basic position shown in FIG. 5 when the drive lever is not actuated. The displacement direction of the coupling rod 123 when the drive lever is actuated is counter to the tensile force of the tension spring 124 and is indicated by the arrow 145 in FIG. 5.

As can be seen from the view of a detail of the actuating device of FIG. 9, the output shaft 125 of the drive motor, schematically shown at 126, for the throttle valve 102 is coupled via a gear mechanism 127 to a drive wheel 128 that rotates freely on the throttle valve shaft 101. An electromagnet 129, the armature of which is embodied by the drive wheel 128, is firmly joined to the throttle valve shaft 101. The drive wheel 128 is located directly before the opening of a cup-shaped magnet housing 130, in which a cylindrical exciter coil 131 is disposed. When there is no current through the exciter coil 131, the drive wheel 128 can rotate freely on the throttle valve shaft 101. When current does flow through the exciter coil 131, the drive wheel 128 is pressed against the magnet housing 130 and held positively there. The drive wheel 128, driven via the gear mechanism 127, is thus coupled to the throttle valve shaft 101 in a manner secured for rotation with it, so that a rotation of the output shaft 125 is transmitted to the throttle valve shaft 101. The delivery of electric current to the exciter coil 131 takes place via an electronic control unit, not shown here but corresponding to the central electronic unit 44 of FIG. 2. During unhindered, i.e., normal operation, the exciter coil 131 has current through it continuously, while in the event of failure of the control unit and/or if the drive motor 126 is disconnected from current in a malfunction, the current to the exciter coil 131 is interrupted as well, thus disengaging the electromagnetic clutch embodied by the drive wheel 128 and the electromagnet 129. Upon the disengagement of the electromagnetic clutch, the throttle valve shaft 101 and thus the throttle valve 102 is uncoupled from the drive motor 126 and the gear transmission 127.

In the pivot range of the disk segment 104 between the adjustable fixed stop 115 and the counterpart stop 109 on the driver plate 108, the throttle valve 102 is actuated by the electric drive motor 126, which receives a control signal or a corresponding control voltage from the control unit. To this end, an electric set-point value transducer 132 is couped to the drive lever, its output signals that are delivered to the control unit being a standard for the instantaneous positions of the drive lever. As a function of these set-point signals, the control unit controls the drive motor 126, so that in the aforementioned range between the adjustable fixed stop 115 and the counterpart stop 109, the throttle valve 102 is adjusted exclusively by the drive motor 126. As suggested in FIGS. 5 and 6, the set-point value transducer 132 is embodied as a rotational angle potentiometer, the electrical wiper paths 133 of which are disposed on the driver plate 108 concentrically with the driver shaft 107 (see FIG. 5). It is sufficient for the wiper paths 133 to extend only over a certain rotational angle portion of the driver plate 108, corresponding to the maximum rotary stroke of the driver plate 108. The wipers 132 of the rotational angle potentiometer that contact the wiper paths 133 are secured in the housing 106.

The mode of operation of the actuating device 100 described above is as follows:

Idling: The control unit regulates the drive motor 126 and hence the throttle valve 102 in the range between the adjustable fixed stop 115 and the counterpart stop 109, the position of which is defined by the driver plate 108, which rests on the associated fixed stop 114 under the influence of the restoring spring 112. If the control unit should fail, or if the drive motor 126 is disconnected from electric current because of a malfunction, then the throttle valve 102 is always kept open by the idling spring 113. The engine does not stop. The opening angle of the throttle valve 102 is approximately 10°, but this must be adapted to a given vehicle and engine.

Driving: The driver's intention is imparted to the drive letter. Its position is transmitted to the driver plate 108, via the coupling rod 123, the lever 122, the pivot 117 and the crank rod 116, and as a result the driver plate 108 pivots by a predetermined rotational angle, counter to the force of the restoring spring 112. The rotation of the driver plate 108 effects a corresponding setting of the set-point value transducer 132, the output signal of which is transmitted to the control unit. From the output signal of the set-point value transducer 132, the control unit forms a control signal for the drive motor 126, which with the electromagnetic clutch 128, 129 engaged rotates the throttle valve shaft 101, causing the throttle valve 102 and the disk segment 104 to follow the driver plate 108. If slip arises in the drive wheels 12 during the drive, then this slip is reported to the control unit via the sensors 20, as already noted above. The control unit now reverses the drive motor 126, so that the throttle valve 102 is pivoted in the closing direction, and the disk segment 104 is rotated such that its stop 105 moves away from the counterpart stop (this is the traction control, or ASR, situation). The driver plate 108 and hence the set-point transducer 132 retain their position dictated by the position of the drive lever.

Cruise control: If the cruise control, known per se, which seeks to keep the vehicle at a given speed regardless of the drive lever position, is switched on, then the drive motor 126 is influenced by the control unit such that it drives the throttle valve shaft 101 far enough that the stop 105 of the disk segment 104 rests on the counterpart stop 109 of the driver plate 108, driving the driver plate counter to the force of the restoring spring 112. The slot 120 and link block 121 assure that despite the movement of the crank rod 116 along with the driver plate 108, the coupling rod 123 to the drive lever remains unaffected.

Emergency operation: If the control unit fails, or if the driver motor 126 is disconnected electrically by the control unit because of a malfunction, then the exciter coil 131 of the electromagnet 129 is disconnected electrically as well. The clutch embodied by the drive wheel 128 and the electromagnet 129 between the throttle valve shaft 101 and the drive motor 126 is disengaged. The restoring spring 112 rotates the driver plate 108 until it strikes its fixed stop 114. Along with the driver plate 108, the throttle valve shaft 102 is also pivoted in the direction of its closing position. The idling spring 113 rotates the disk segment 104 until the stop 105 rests on the counterpart stop 109, thus moving the throttle valve 102 into a raised idling position. The gear mechanism 127 and the drive motor 126 are separated from the throttle valve shaft 101 by the disengaged clutch 128/129, so that no additional frictional resistance arises at the throttle valve shaft 101. If the drive lever is then actuated, the driver plate 108 is rotated—as already described—via the crank rod 116, the pivot lever 117, the lever 122, and the coupling rod 123. The idling spring 113 keeps the stop 105 in contact with the counterpart contact 109 during the motion of the driver plate 108, so that the throttle valve 102 is pivoted in accordance with the rotational motion of the drive plate 108.

Figure 7:
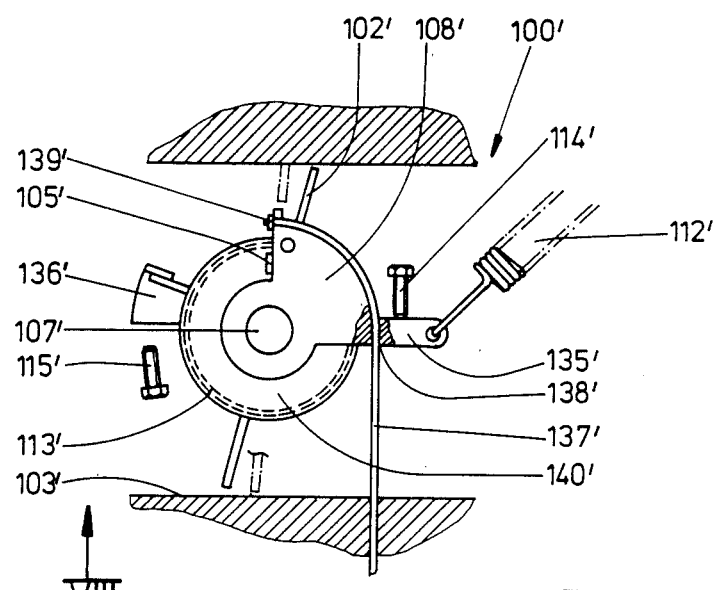
FIG. 7 is a view identical to that of FIG. 5 of an actuating device in accordance with a third exemplary embodiment.
Figure 8:
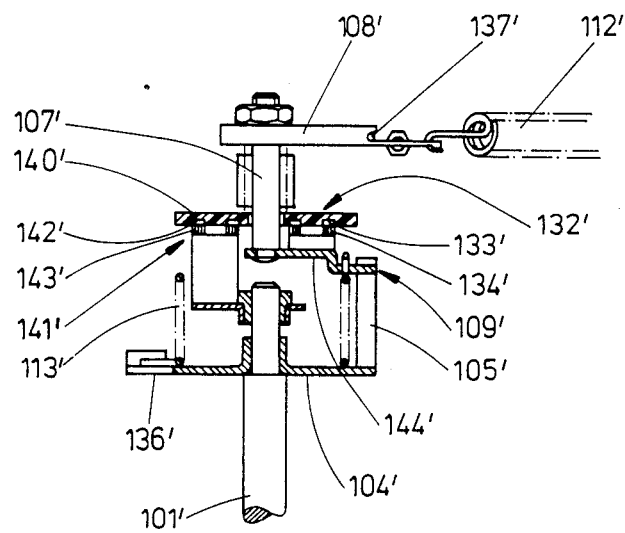
FIG. 8 is a view in the direction of the arrow VIII of FIG. 7.

In FIGS. 7 and 8, an actuating device 100' that is modified by comparison with the actuating device 100 is shown in plan view and from below. Identical elements are identified by the same reference numerals, with a prime to distinguish them. The stop 105' and the counterpart stop 109' are again secured for rotation with the throttle valve shaft 101' and driver shaft 107', respectively. The stop 105' protrudes at right angles from a disk 104', which is mounted on and secured for rotation with the throttle valve shaft 101'. The counterpart stop 109' is embodied by a hoop 144' protruding from and secured for rotation with the driver shaft 107'. A segmental driver plate 108' is rigidly joined to the driver plate shaft 107'. The driver plate 108' and the disk 104' are coupled to one another via a tension spring 113' embodied as a torsion spring, which assumes the function of the idling spring in FIGS. 5 and 6. The restoring spring 112' is embodied as a tension spring, which at one end engages the housing and at the other engages an outrigger 135' protruding radially from the driver plate 108'. The spring force of the restoring spring 112' is again more than twice as great as the force of the idling spring 113' an is directed counter to it. Under the influence of the restoring spring 112', the outrigger 135' rests on the adjustable fixed stop 114'. The disk 104' likewise has a radial outrigger 136', which cooperates with the fixed stop 115'. The two fixed stops 114' and 115' are disposed in the same manner as that described in conjunction with FIGS. 5 and 6. The connection between the driver plate 108' and the drive lever is established here not by a bar linkage but by a Bowden cable 137'. This Bowden cable 137' is guided in a bore 138' in the outrigger 135' and is retained at the end in a stop bolt 139', which rests on the driver plate 108'. As a result, free-wheeling of the driver plate 108' in the clockwise direction is assured during cruise control operation, without the Bowden cable 137' or the drive lever being affected.

Once again, the set-point value transducer 132' is embodied as a rotational angle potentiometer. However, its wiper paths 133' are disposed on an insulation carrier 140', which is retained in the housing, not shown. The wipers 134' again contacting the wiper paths 133' are secured on the driver plate 108' for rotation with it. The embodiment of FIG. 8 additionally includes an actual-value transducer 141', which reports the instantaneous pivoted position of the throttle valve 102' to the control unit. The actual-value transducer 141', like the set-point value transducer 132', is embodied as a rotational angle potentiometer, the wiper paths 142' of which, like the wiper paths 133' of the set-point value transducer 132', are disposed on the insulation carrier 140', once again coaxially with the driver shaft 107', which is surrounded by the insulation carrier 140'. The wipers 143' resting on the electric wiper paths 142' are secured via a holder 144' on the throttle valve shaft 101' such that they rotate with it. This embodiment of the set-point and actual-value transducers 132' and 141' has the advantage that the stationary parts of the rotational angle potentiometer are united on a single component, namely the insulation carrier 140', in a structurally simple manner.

The mode of operation of the modified actuating device 100' is identical to that of the actuating device 100 described in conjunction with FIGS. 5 and 6.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A device for actuating a throttle valve of an internal combustion engine in a motor vehicle, having drive and driven wheels, comprising a reversible electric drive motor (32) having an output shaft (36) which is operatively connected with a rotatable throttle valve shaft (34) of the throttle valve (30) to pivot the throttle valve, a drive means which predetermines a setpoint pivoted position of said throttle valve, a control unit (44) for controlling said drive motor as a function of a slip of the drive wheels of the vehicle, said throttle valve (30; 102; 102') is coupled with a first rotary means 56 which includes a throttle valve stop (80; 105; 105') for a rotation with, said throttle valve shaft, a restoring spring (68, 70', 112, 112'), a second rotary means (58), a movable counterpart stop (78; 109; 109') on said second rotary means that is spring-loaded by said restoring spring (68, 70', 112, 112') in a closing direction of the throttle valve (30; 102; 102'), said counterpart stop being in engagement with said throttle valve stop and acting directly thereupon, and said stop (78; 109; 109') second rotary means (58) is coupled to said drive means in such a manner that said movable counterpart stop is moved by the drive means counter to a force, of the restoring spring (68, 70; 112; 112').

2. A device as defined by claim 1, in which said drive motor (32) is controlled by said control unit (44) during unimpeded operation such that said drive motor (32) effects a followup of said throttle valve stop (80) with respect to said counterpart stop (78), so that when the drive wheels (29) of the motor vehicle (10) are without slip, the throttle valve stop (80) always rests on the counterpart stop (78).

3. A device as defined by claim 2, in which a maximum torque exerted on the throttle valve stop (80) by the drive motor (32) is less than a torque exerted on the counterpart stop (78) by the restoring spring (68, 70).

4. A device as defined by claim 2, wherein said throttle valve stop (80) of the throttle valve (30) is disposed on said first rotary means (56) and firmly connected to the throttle valve shaft (34), and said counterpart stop (78) is seated on said second rotary means (58) adjacent to said first rotary means (56), said device including an auxiliary shaft (52), said second rotary means being firmly connected to said auxiliary shaft (52) in alignment with the throttle valve shaft (34).

5. A device as defined in claim 3, wherein said throttle valve stop (80) of the throttle valve (30) is disposed on said first rotary means (56) and firmly connected to the throttle valve shaft (34), and said counterpart stop (78) is seated on said plate (58) adjacent to said first rotary means (56), said device including an auxiliary shaft (52), second rotary means being firmly connected to said auxiliary shaft (52) in alignment with the throttle valve shaft (34).

6. A device for actuating a throttle valve of an internal combustion engine in a motor vehicle, having drive and driven wheels, comprising a reversible electric drive motor (32) having an output shaft (36) which is operatively connected with a rotatable throttle valve shaft (34) of the throttle valve (30) to pivot the throttle valve, a drive means which predetermines a setpoint position of said throttle valve, a control unit (44) for controlling said drive motor as a function of a slip of the drive wheels of the vehicle, said throttle valve (30; 102; 102') is coupled with a throttle valve stop (80; 105; 105') for rotation with said throttle valve shaft, a disk (56), said throttle valve stop (80) of the throttle valve (30) is disposed on said disk (56) and firmly connected to the throttle valve shaft (34), a plate (58), a movable counterpart stop (78) seated on said plate (58) adjacent to said disk (56), an auxiliary shaft (52), said plate is firmly connected to said auxiliary shaft (52) in alignment with the throttle valve shaft (34), a restoring spring (68, 70', 112, 112'), said movable counterpart stop (78; 109; 109') is spring-loaded by said restoring spring (68, 70'; 112, 112') in a closing direction of the throttle valve (30; 102; 102') and is associated with said throttle valve stop, and said plate (58) is coupled to said drive means in such a manner that said movable counterpart stop is moved by the drive means counter to the force of the restoring spring (68, 70; 112; 112').

7. A device as defined in claim 6, in which said throttle valve shaft (34) and said auxiliary shaft (52) are supported in interconnected bodies (48, 50).

8. A device as defined by claim 7, in which said auxiliary shaft (52) has one end that protrudes from said body (50), and said protruding end is provided with a component (54) which is engaged by an element (28) connected to said drive lever (26).

9. A device as defined by claim 7, in which said restoring spring has a prestressed first leg spring (68, 70) surrounding said auxiliary shaft (52), one end of said leg spring being fixed on said body (50) supporting said auxiliary shaft (52) and the other end (66) of said restoring spring being retained on said plate (58).

10. A device as defined by claim 9, in which said restoring spring has a second leg spring (70), which is disposed substantially concentrically with said first leg spring (68, 70).

11. A device as defined by claim 6, in which said valve throttle stop (80) of the throttle valve (30) is embodied on a protrusion (60) bent out from said disk (56) toward said plate (58), said protrusion being longer than a spacing between the disk (56) and the plate (58).

12. A device as defined by claim 6, in which said counterpart stop is embodied by a boundary edge (78) of a recess (62) disposed in the plate (58).

* * * * *